United States Patent [19]

Bauer et al.

[11] Patent Number: 4,461,879

[45] Date of Patent: Jul. 24, 1984

[54] CURABLE SATURATED POLYEPOXIDE-TRIGLYCIDYL CYANURATE COMPOSITIONS

[75] Inventors: Ronald S. Bauer; Larry S. Corley, both of Houston, Tex.

[73] Assignee: Shell Oil Company, Houston, Tex.

[21] Appl. No.: 376,475

[22] Filed: May 10, 1982

[51] Int. Cl.³ .................. C08G 59/04; C08G 63/02
[52] U.S. Cl. .................. 525/526; 525/423; 525/510
[58] Field of Search ................ 525/423, 526

[56] References Cited

U.S. PATENT DOCUMENTS

| | | | |
|---|---|---|---|
| 2,640,037 | 5/1953 | Parry et al. | 260/42 |
| 2,651,589 | 9/1953 | Shokal et al. | 154/140 |
| 3,336,241 | 8/1967 | Shokal | 160/2 |
| 3,480,692 | 11/1969 | Batzer et al. | 525/526 |

*Primary Examiner*—John C. Bleutge
*Assistant Examiner*—Robert E. L. Sellers
*Attorney, Agent, or Firm*—Norris E. Faringer

[57] ABSTRACT

The present invention is particularly directed to a coating composition exhibiting faster cure times and improved physical properties which comprise (1) from about 60% to about 95% by weight of a saturated epoxy resin, (2) from about 5% to about 40% by weight of triglycidyl cyanurate (or triglycidyl thiocyanurate) and (3) a curing amount of an epoxy curing agent, preferably an amino-containing curing agent.

7 Claims, No Drawings

CURABLE SATURATED POLYEPOXIDE-TRIGLYCIDYL CYANURATE COMPOSITIONS

FIELD OF THE INVENTION

This invention is directed to epoxy coating compositions exhibiting improved cure rate, hardness, blush resistance and ketone resistance. More particularly, the invention is directed to saturated epoxy resin-triglycidyl cyanurate blends which are cured with epoxy curing agents, preferably amines and amides to produce coatings exhibiting major improvements in physical properties.

BACKGROUND OF THE INVENTION

Saturated epoxy resins, e.g., glycidyl polyethers of saturated polyphenols (saturated BPA), when reacted with amino-containing curing agents (e.g., aliphatic amines), cure at ambient temperatures to produce coatings which exhibit good weatherability. See, for example, U.S. Pat. No. 4,108,824. One of the deficiencies of such saturated resins in coating formulations is relatively slow cure, i.e., long "set-to-touch" time. There is a need, therefore, to reduce the curing time of such saturated epoxy resins without reducing significantly the other advantages and excellent physical properties.

SUMMARY OF THE INVENTION

Faster curing saturated epoxy resin coating compositions are described which also exhibit improved physical properties. More particularly, the present invention is directed to a curable polyepoxide coating composition comprising a blend of a saturated epoxy resin and triglycidyl cyanurate.

DESCRIPTION OF THE PREFERRED EMBODIMENTS

The present invention is particularly directed to a coating composition exhibiting faster cure times and improved physical properties which comprise (1) from about 60% to about 95% by weight of a saturated epoxy resin, (2) from about 5% to about 40% by weight of triglycidyl cyanurate (or triglycidyl thiocyanurate) and (3) a curing amount of an epoxy curing agent, preferably an amino-containing curing agent.

SATURATED EPOXY RESINS

The epoxy compounds useful in the present composition include those compounds derived from polyhydric phenols and having at least one vicinal epoxy group wherein the carbon-to-carbon bonds within the six-membered ring are saturated. Such epoxy resins may be obtained by two well-known techniques, i.e., (1) by the hydrogenation of glycidyl polyethers of polyhydric phenols, or (2) by the reaction of hydrogenated polyhydric phenols with epichlohydrin in the presence of a Lewis Acid catalyst and a subsequent dehydrochlorination in an alkaline medium. The method of preparation forms no part of the present invention and the resulting saturated epoxy resins derived by either method are suitable in the present compositions.

Briefly, the first method comprises the hydrogenation of glycidyl polyethers of polyhydric phenols with hydrogen in the presence of a catalyst consisting of rhodium or ruthenium supported on an inert carrier at a temperature below about 50° C. This method is thoroughly disclosed in U.S. Pat. No. 3,336,241, and is suitable for use in preparing saturated epoxy resins. Accordingly, the relevant disclosure of U.S. Pat. No. 3,336,241 is incorporated herein by reference.

The second method comprises the condensation of a hydrogenated polyphenol with an epihalohydrin, such as epichlorohydrin, in the presence of a suitable catalyst such as $BF_3$, followed by the dehydrohalogenation in the presence of caustic. When the phenol is hydrogenated bisphenol A, the resulting saturated epoxy compound is sometimes referred to as "diepoxidized hydrogenated bisphenol A", or more properly as the diglycidyl ether of 2,2-bis(4-cyclohexanol)propane.

In any event, the term "saturated epoxy resin", as used herein shall be deemed to mean the glycidyl ethers of polyhydric phenols wherein the aromatic ring structure of the phenols is or has been saturated.

An idealized structural formula representing the preferred saturated epoxy compounds is as follows:

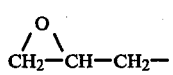

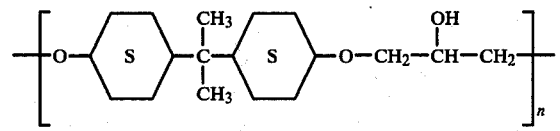

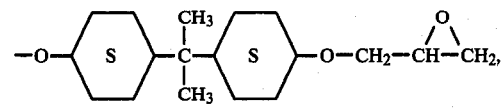

wherein n has a value so that the average molecular weight of the saturated polyepoxide is from about 350 to about 2500.

TRIGLYCIDYL CYANURATE OR THIOCYANURATE

The compound which is blended with the saturated epoxy resin is triglycidyl cyanurate or triglycidyl thiocyanurate. Preferred is triglycidyl cyanurate, which is a white, crystalline, free-flowing powder melting in the range of 50°-60° C. and is readily soluble in acetone, alcohols, and chloroform; sparingly soluble in water and toluene; and rather insoluble in cyclohexane, n-heptane and diethyl ether.

Triglycidyl cyanurate (TGC) has the following structural formula:

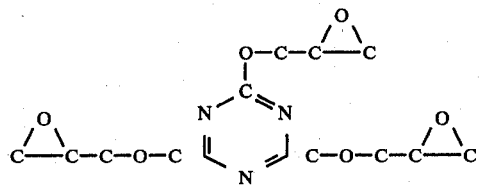

The preparation of TGC forms no part of the present invention and may be by any process. For example, TGC can be prepared by reacting triallyl cyanurate with a peracid such as perbenzoic acid or peracetic acid. It is understood that this method produces by-products, partial conversion and low yield. Another method comprises reacting cyanuric chloride with glycidol in chloroform, followed by neutralization with NaOH and recovery.

CURING AGENTS

Triglycidyl cyanurate alone has been cured with amino-containing compounds such as piperidine, 2,4,6-tris(dimethylaminomethyl)phenol and dicyandiamide to produce glass laminates and the like.

Saturated epoxy resins are preferably cured with nitrogen- or amino-containing compounds to produce coatings.

Accordingly, although both acid and alkaline curing agents may be employed to cure the saturated epoxy/TGC blends, the alkaline, especially the amino-containing compounds (aliphatic amines, cycloaliphatic amines, aromatic amines, polyamides, etc.) are preferred.

Suitable epoxy curing agents include the alkaline and acidic materials which are normally epoxy curing agents. Examples of suitable curing agents include, among others, the polybasic acids and their anhydrides, such as, for example, the di, tri- and higher carboxylic acids as oxalic acid, phthalic acid, terephthalic acid, succinic acid, alkyl and alkenyl-substituted succinic acids, tartaric acid, and particularly the polymerized unsaturated acids, such as, for example, those containing at least 10 carbon atoms, and preferably more than 14 carbon atoms, as for instance dodecenedioic acid, 10,12-eicosadienedioic acid, and anhydrides as phthalic anhydride, succinic anhydride, maleic anhydride, nadic anhydride, pyromellitic anhydride and the like.

Other types of acids that are useful are those containing sulfur, nitrogen, phosphorus or halogens; e.g. chlorendic acid, benzenephosphinic acid, sulfonyl dipropionic acid bis(4-carboxyphenyl)amide.

Other preferred curing agents include the amino-containing compounds, such as, for example, diethylene triamine, triethylene tetramine, dicyandiamide, melamine, pyridine, cyclohexylamine, benzyldimethylamine, benzylamine, diethylaniline, triethanolamine, piperidine, tetramethylpiperazine, N,N-dibutyl-1,3-propane diamine, N-N-diethyl-1,3-propane diamine, 1,2-diamino-2-methylpropane, 2,3-diamino-2-methylbutane, 2,3-diamino-2-methylpentane, 2,4-diamino-2,6-dimethyloctane, dibutylamine, dioctylamine, dinonylamine, distearylamine, diallylamine, dicyclohexylamine, methylethylamine, ethylcyclohexylamine, pyrrolidine, 2-methylpyrrolidine, tetrahydropyridine, 2-methylpiperidine, 2,6-dimethylpiperidine, diaminopyridine, meta-phenylene diamine and the like, and soluble adducts of amines and poly-epoxides and their salts, such as described in U.S. Pat. Nos. 2,651,589 and 2,640,037. Still other examples include the acetone soluble reaction products of polyamines and monoepoxides, the acetone soluble reaction products of polyamines with unsaturated nitriles, such as acrylonitrile, imidazoline compounds as obtained by reaction of monocarboxylic acids with polyamines, sulfur and/or phosphorus-containing polyamines as obtained by reacting a mercaptan or phosphine containing active hydrogen with an epoxide halide to form a halohydrin, dehydrochlorinating and then reacting the resulting product with a polyamine, soluble reaction product of polyamines with acrylates, and many other types of reaction products of the amines.

Still other curing agents that may be used include boron trifluoride and complexes of boron trifluoride with amines, ethers, phenols and the like, Lewis acid metal salts, such as aluminum chloride, zinc chloride, and other salts, such as zinc fluoborate, magnesium perchlorate and zinc fluosilicate; inorganic acids and partial esters as phosphoric acid and partial esters thereof including n-butyl orthothiophosphate, diethyl orthophosphate and hexaethyltetraphosphate and the like.

Another type of curing agent which may be employed includes the polyamides containing active amino and/or carboxyl groups, and preferably those containing a plurality of amino hydrogen atoms. Examples of polybasic materials used in making these polyamides include, among others, 1,10-decanedioic acid, 1,12-dodecanedioic acid, 1,20-eicosadienedioic acid, 1,14-tetradecanedioic acid, 1,18-octadecanedioic acid and dimerized and trimerized fatty acids as described above. Amines used in making the polyamides include preferably the aliphatic and cycloaliphatic polyamines as ethylene diamine, diethylene triamine, triethylene tetramine, tetraethylene pentamine, 1,4-diaminobutane, 1,3-diaminobutane, hexamethylene diamine, 3-(N-isopropylamino)propylamine and the like. Especially preferred polyamides are those derived from the aliphatic polyamides containing no more than 12 carbon atoms and polymeric fatty acids obtained by dimerizing and/or trimerizing ethylenically unsaturated fatty acids containing up to 25 carbon atoms. These preferred polyamides have a viscosity between 10 and 750 poises at 40° C., and preferably to 250 poises at 40° C. Preferred polyamides also have amine values of 50 to 450.

Still another group of curing agents are those based on melamine reaction products containing methylol substituents.

Still other suitable curing agents comprise the imidazoles and benzimidazoles as well as adducts thereof with epoxy resins. Suitable such imidazoles and adducts therefrom are described in U.S. Pat. No. 3,756,984.

Especially preferred epoxy curing agents are the amino-containing compounds such as the aliphatic, cycloaliphatic, aromatic amines and polyamines as well as the polyamides and the like.

Especially useful aliphatic amines have the general formula

wherein x is an integer from zero to 6.

Examples of suitable aliphatic amines include, among others, ethylenediamine (EDTA), diethylenetriamine (DTA), triethylene tetraamine (TETA), and tetraethylene pentaamine (TEPA).

The amount of curing agent may vary considerably depending upon the particular agent employed. In general, the acids, anhydrides, polyamides, polyamines, polymercaptans, etc., are preferably utilized in at least 0.6 chemical equivalent amounts, and preferably 0.8 to 2.0 equivalent amounts. An equivalent amount refers to that amount needed to give one active H (or anhydride group) per epoxy group.

SOLVENTS

The present compositions may be employed neat or they may be applied using a solvent.

Suitable solvents include the aliphatic alcohols and glycols containing up to about 6 carbon atoms and at least one OH group. Examples of such solvents include methanol, ethanol, propanol, isopropanol, n-butanol, iso-butanol, hexanediol, ethylene glycol and propylene glycol.

Other suitable solvents include the so-called glycol ethers such as the methyl, ethyl and butyl ethers of ethylene glycol or propylene glycol. Such glycol ethers are commercially available under the trade designation of OXITOL® such as methyl OXITOL® Glycol ether; CELLOSOLVE® and methyl CELLOSOLVE®; and PROPASOL® B.

Various conventional additives may be included in the polyepoxide resin, triglycidyl cyanurate, curing agent blend such as solvents, curing agent accelerators, antioxidants, fungicides, diluents, pigments, fillers, fibrous materials, dyes, resins, polyolefins, plasticizers, extenders, etc.

The temperature employed in the cure will vary depending chiefly on the type of curing agent. The amino-containing curing agents generally cure at or near room temperature although temperatures up to about 120° C. may be used. The acids, anhydrides, and melamine derivatives, on the other hand, are generally used for heat, such as temperatures ranging from 100° C. to about 200° C. Preferred temperatures range from about 60° C. to about 125° C.

The compositions containing the polyepoxides, triglycidyl cyanurate and curing agents may be used for a variety of important applications. They may be used, for example, as adhesives for metal, wood, concrete, plaster and the like, and as surface coatings for various types of surfaces. The new compositions may also be used in the preparation of laminates or resinous particles reinforced with fibrous textiles. They may also be used in the formation of castings and molding and for the encapsulation of electrical equipment.

An especially preferred coating composition comprises (1) from about 70 to 90 parts by weight of a saturated epoxy resin, preferably a diglycidyl ether of a hydrogenated polyphenol such as a hydrogenated 2,2-bis(4-hydroxyphenyl)propane, (2) from about 10 to 30 parts by weight of triglycidyl cyanurate and (3) a curing amount of an amino-containing compound, preferably an aliphatic or cycloaliphatic amine or polyamine or polyamide.

To illustrate the manner in which the invention may be carried out, the following examples are given. It is to be understood, however, that the examples are for the purpose of illustration only and that the invention is not to be regarded as limited to any of the specific conditions or reactants recited therein.

Unless otherwise indicated, parts and percentages are by weight. Saturated Polyepoxide A (Resin A) is a diglycidyl ether of hydrogenated BPA having an idealized structure noted hereinbefore having a WPE of about 234, and an average molecular weight of about 460–470 and containing 1% by weight of TINUVIN 328 (substituted-chlorobenzotriazole), an actinic stabilizer.

Saturated Polyepoxide B (Resin B) is a resin prepared by hydrogenating a diglycidyl ether of BPA having an average molecular weight of about 380 and a WPE of about 190 over a rhodium catalyst by the process of U.S. Pat. No. 3,336,241.

VERSAMID® 1540 is a commercially obtainable saturated polyaminoamide derived from the condensation of dimer fatty acids and polyamines.

EXAMPLE I

This example illustrates a typical preparation of triglycidyl cyanurate.

A solution of 555 g (3 moles) of cyanuric chloride in 2 liters of chloroform containing 1030 g (14 moles) of glycidol is prepared at room temperature. This mixture is cooled in an ice bath to 0°–5° C. and 375 g of NaOH (9.3 moles) in 450 g of water is very slowly dropped in with vigorous stirring. Constant cooling is required to control the exothermic heat of reaction. When the addition is completed in 3–4 hours, the stirring is continued for another ½ hour before 2 liters of water are added to dissolve the precipitated salt and unchanged alkali. A very small amount of black tarry material which is presumed to come from impurities in the cyanuric chloride is filtered off, the upper (water) layer discarded, and the chloroform layer washed four times with distilled water or until the washings are neutral. The wet chloroform solution is then concentrated at 25° C. in vacuo to a final pressure of 1–2 mm. One liter of diethyl ether is introduced and the mixture chilled and stirred until the product crystallizes. The solid material is removed by filtration, washed twice with diethyl ether and dried at room temperature in vacuo.

An essentially quantitative yield of triglycidyl cyanurate is obtained as a white, free-flowing crystalline powder.

Product analyses from a typical preparation are given below.

|  | Found | Theoretical |
|---|---|---|
| % C | 48.0 | 48.4 |
| % H | 5.0 | 5.1 |
| % N | 14.0 | 14.14 |
| % Cl | 0.65 | 0.0 |
| Epoxide $\frac{eq}{100 g}$ | 0.924 | 1.01 |
| Mol wt | 328 | 297 |
| % water | 0.25 | 0.0 |

EXAMPLE II

This example illustrates the preparation of the present compositions and the physical properties thereof.

Three triglycidyl cyanurate—Resin A mixtures (10:90, 20:80 and 30:70 w:w) were prepared and mixed with a stoichiometric quantity of Versamid® 1540 in n-butanol solution to form clear unpigmented coatings. These coatings were applied to metal coupons and allowed to cure at room temperature. Results of tests on the coatings during and after cure are shown in Table 1.

As can be seen in Table 1, Gardner drying time (by any of the three measures used) is significantly lessened by incorporation of TGC into the coatings. This is particularly the case with respect to the important factor of loss of initial tackiness. "Set-to-touch" time, for example, is decreased from >8 hours when the epoxy component is pure Resin A to 1 hour for an 80:20 mixture of Resin A and TGC. Pencil hardness, both after 14 days and (particularly) after 24 hours, is increased by TGC modification, with coating hardness increasing with increased incorporation of TGC. Blush, both after 24 hours and after 14 days, also decreases significantly with increased level of TGC in the coating. The use of TGC is also effective (Table 1) in increasing the resistance of the coating to methyl isobutyl ketone.

TABLE 1

Use of Triglycidyl Cyanurate in Polyamide-Cured Saturated Polyepoxide Based Coating

| | EXPERIMENT | | | |
|---|---|---|---|---|
| | 1 | 2 | 3 | 4 |
| Coating Composition: | | | | |
| TGC, % of total epoxy (w/w)[a] (balance Resin A) | 0 | 10 | 20 | 30 |
| WPE of total epoxy mixture | 238 | 214 | 195 | 179 |
| Versamid 1540, phr (based on total epoxy) | 55 | 69 | 75 | 82 |
| n-Butanol, phr (based on total epoxy) | 28 | 28 | 28 | 28 |
| Appearance of mixture | Clear | Clear | Clear | Hazy |
| Room temperature gel time, hr. (in bulk) | — | — | 2 | 1¼ |
| Coating Properties: | | | | |
| Drying time as determined by Gardner recorder | | | | |
| "Set-to-touch", hr | 8–9 | 3 | 1 | 1 |
| "Cotton free", hr | 13 | 4–5 | 2 | 1¼ |
| "Through dry", hr | 22½ | 21 | 15–16 | 15 |
| Pencil hardness (30' induction) | | | | |
| 24 hours | 3B | B | HB | F |
| 14 days | H | H | 2H | 2H |
| Blush [visual determination] (30' induction) | | | | |
| 24 hours | Heavy | Heavy | Medium | Very light |
| 14 days | Heavy | Medium | Medium | None |
| Methyl isobutyl ketone resistance, minutes[b] | 15 | 24 | 60 | 60 |

[a]The TGC sample used had an experimentally determined WPE of 114 (theoretical = 99).
[b]Time required for film hardness to drop 2 pencil units while in contact with cotton soaked with methyl isobutyl ketone.

EXAMPLE III

Related results are obtained when Resin B is substituted for Resin A in Example II.

EXAMPLE IV

If the Versamid ® 1540 is replaced with an equivalent amount of diethylenetriamine, 2-methyl imidazole, trimellitic anhydride, methyl hexahydrophthalic anhydride, methyl tetrahydrophthalic anhydride, similar results are expected based on experiments utilizing glycidyl ethers of BPA.

What is claimed is:

1. A curable composition comprising (1) from about 60 to about 95 parts by weight of a saturated polyepoxide having the structural formula:

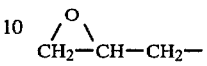

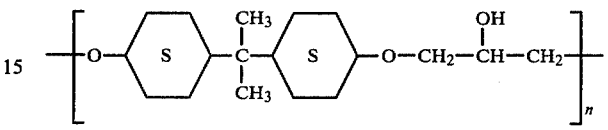

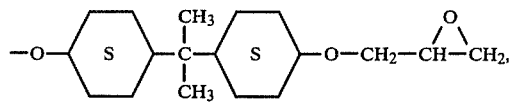

wherein n has a value so that the average molecular weight of the saturated polyepoxide is from about 350 to about 2500, (2) from about 5 to about 40 parts by weight of triglycidyl cyanurate or triglycidyl thiocyanurate and (3) a curing amount of an epoxy curing agent.

2. The composition of claim 1 wherein the weight ratio of polyepoxide to triglycidyl cyanurate is from about 90:10 to about 70:30.

3. The composition of claim 1 wherein the saturated polyepoxide is a hydrogenated glycidyl ether of 2,2-bis(4-hydroxyphenyl) propane.

4. The composition of claim 1 wherein the saturated polyepoxide is a glycidyl ether of 2,2-bis(4-cyclohexanol)propane.

5. The composition of claim 1 wherein the epoxy curing agent is an amino-containing compound.

6. The composition of claim 5 wherein the amino-containing compound is an aliphatic amine.

7. The composition of claim 5 wherein the amino-containing compound is a polyamide.

* * * * *